(12) United States Patent
Weldon et al.

(10) Patent No.: US 9,144,936 B2
(45) Date of Patent: Sep. 29, 2015

(54) IDLE AIR CONTROL VALVE WITH PLASTIC HOUSING AND RETENTION FEATURES

(75) Inventors: Craig Andrew Weldon, Chatham (CA); Allen Tamman, Chatham (CA); David Rene Forgeron, Chatham (CA); Calvin Wang, Chatham (CA); Francis Peter Vink, Ridgetown (CA)

(73) Assignee: Continental Automotive Systems, Inc., Auburn Hills, MI (US)

( * ) Notice: Subject to any disclaimer, the term of this patent is extended or adjusted under 35 U.S.C. 154(b) by 257 days.

(21) Appl. No.: 13/642,677

(22) PCT Filed: Apr. 5, 2011

(86) PCT No.: PCT/US2011/031270
§ 371 (c)(1),
(2), (4) Date: Jan. 17, 2013

(87) PCT Pub. No.: WO2011/133320
PCT Pub. Date: Oct. 27, 2011

(65) Prior Publication Data
US 2013/0104842 A1  May 2, 2013

Related U.S. Application Data

(60) Provisional application No. 61/326,757, filed on Apr. 22, 2010.

(51) Int. Cl.
*B29C 65/02* (2006.01)
*H02K 5/08* (2006.01)
(Continued)

(52) U.S. Cl.
CPC ............. *B29C 65/02* (2013.01); *F02D 31/003* (2013.01); *F02M 3/09* (2013.01); *F16K 31/0644* (2013.01);
(Continued)

(58) Field of Classification Search
CPC ......... F02M 3/075; F02M 3/07; F02M 69/32; F02D 31/005; F02D 2011/102
USPC ....................... 123/339.27, 339.25
See application file for complete search history.

(56) References Cited

U.S. PATENT DOCUMENTS 5,220,224 A    6/1993  Bosman
5,247,216 A *  9/1993  Bosman et al. ............ 310/49.18
(Continued)

FOREIGN PATENT DOCUMENTS

CN    1541438 A    10/2004
DE    4117763 A1   12/1991
(Continued)

OTHER PUBLICATIONS

"Engage." : Definition of in Oxford Dictionaries (Thesaurus of English) (US). Web. Jan. 30, 2015. <http://www.oxforddictionaries.com/us/definition/english-thesaurus/engage>.*
(Continued)

*Primary Examiner* — Stephen K Cronin
*Assistant Examiner* — Joshua A Campbell

(57) ABSTRACT

A linear actuator includes a plastic housing having an integral flange for mounting the actuator. A stator assembly, having windings, is disposed in the plastic housing. A rotor assembly, having a permanent magnet, is mounted for rotation with respect to the stator assembly such that when the windings are energized, a magnetic field is generated to cause rotation of the rotor assembly. A shaft is restricted from rotation and is associated with the rotor assembly such that rotation of the rotor assembly causes linear movement of the shaft. Connector structure houses leads for powering the windings. The plastic housing has an annular end that captures an annular surface of the connector structure to couple the plastic housing to the connector structure.

10 Claims, 5 Drawing Sheets

(51) Int. Cl.
    *H02K 7/06*        (2006.01)
    *H02K 15/14*      (2006.01)
    *F02D 31/00*      (2006.01)
    *F02M 3/09*       (2006.01)
    *F16K 31/06*      (2006.01)
    *F16K 99/00*      (2006.01)
    *F16K 31/08*      (2006.01)
    *B29L 31/34*      (2006.01)

(52) U.S. Cl.
    CPC ............... *F16K 31/08* (2013.01); *F16K 99/00* (2013.01); *H02K 5/08* (2013.01); *H02K 7/06* (2013.01); *H02K 15/14* (2013.01); *B29L 2031/3481* (2013.01); *Y10T 137/0491* (2015.04)

(56) References Cited

U.S. PATENT DOCUMENTS

| | | | | |
|---|---|---|---|---|
| 5,567,998 | A * | 10/1996 | Ineson et al. | 310/90 |
| 6,492,751 | B1 * | 12/2002 | Ineson et al. | 310/71 |
| 8,616,522 | B2 * | 12/2013 | Weldon et al. | 251/129.11 |
| 8,734,141 | B2 * | 5/2014 | Slay et al. | 418/48 |
| 2006/0261692 | A1 * | 11/2006 | Wong et al. | 310/89 |
| 2009/0206685 | A1 * | 8/2009 | Sonohara | 310/49.01 |
| 2011/0062362 | A1 * | 3/2011 | Koyama | 251/129.15 |
| 2013/0104842 | A1 * | 5/2013 | Weldon et al. | 123/339.27 |

FOREIGN PATENT DOCUMENTS

| | | |
|---|---|---|
| DE | 4 423 313 A1 | 7/1994 |
| DE | 4 423 313 | 1/1996 |
| DE | 4423313 A1 | 1/1996 |
| EP | 0550102 A2 | 7/1993 |
| EP | 1 024 578 | 8/2000 |
| EP | 1 024 578 A1 | 8/2000 |
| EP | 1024578 A1 * | 8/2000 ............... H02K 1/14 |
| JP | 05-284717 | 10/1993 |
| JP | 08-014018 A | 1/1994 |
| JP | 08-014018 | 1/1996 |
| JP | 09-247895 | 9/1997 |
| JP | 09-247895 A | 12/1997 |
| JP | 09-331643 | 12/1997 |
| JP | 09-331643 A | 12/1997 |
| JP | 10-299624 | 11/1998 |
| JP | 10-299624 A | 11/1998 |
| JP | 2000-224785 | 8/2000 |
| JP | 2000-224785 A | 8/2000 |
| JP | 2002-027688 | 1/2002 |
| JP | 2002-027688 A | 1/2002 |
| JP | 2004-304986 | 10/2004 |
| JP | 2004-304986 A | 10/2004 |
| JP | 05-284717 | 10/2005 |
| JP | 2008-113531 | 5/2008 |
| JP | 2008-113531 A | 5/2008 |
| JP | 2008-515381 | 5/2008 |
| JP | 2008-515381 A | 5/2008 |
| JP | 2009-213276 | 9/2009 |
| JP | 2009-213276 A | 9/2009 |
| WO | 02075896 A2 | 9/2002 |

OTHER PUBLICATIONS

PCT/US2011/031270, International Search Report and Written Opinion of the International Searching Authority.

* cited by examiner

IDLE AIR CONTROL VALVE WITH PLASTIC HOUSING AND RETENTION FEATURES

This application claims the benefit of the earlier filing date of U.S. Provisional Application No. 61/326,757, filed on Apr. 22, 2010, which is hereby incorporated by reference into this specification.

FIELD

This invention relates to a linear actuator such as a vehicle idle air control valve (IACV) and, more particularly, to an improved IACV having a plastic housing and retention features.

BACKGROUND

The IACV is a digital linear actuator (DLA) mounted externally to the intake manifold of automotive engines that accurately controls throttle airflow in an engine system. Axial alignment of the IACV ensures that a pintle/capnut thereof maintains proper alignment with a throttle body or manifold valve seat. The IACV is needed since vehicle pollution emission control regulations require more precise air/fuel ratios and thus cleaner tailpipe emissions.

The conventional IACV is an automotive grade can-stack style stepper motor which has been in production for 10-15 years. The conventional IACV has a metal housing for stringent environmental standards requiring that Hexavalent (Cr6) plating replaced by Trivalent (Cr3) plating. This housing met the environmental standards but failed to provide sufficient duration for corrosion protection which may result in a cosmetic annoyance to end customers.

Thus, there is a need to provide an improved IACV having a plastic housing that will meet warranty requirements and that can provide a measure of cosmetic appeal due to use of non-corrosive materials.

SUMMARY

An object of the invention is to fulfill the need referred to above. In accordance with the principles of the present invention, this objective is obtained by providing a linear actuator including a plastic housing having an integral flange for mounting the actuator. A stator assembly is disposed in the plastic housing, with the stator assembly having windings. A rotor assembly, having a permanent magnet, is mounted for rotation with respect to the stator assembly such that when the windings are energized, a magnetic field is generated to cause rotation of the rotor assembly. A shaft is restricted from rotation and is associated with the rotor assembly such that rotation of the rotor assembly causes linear movement of the shaft. Connector structure houses leads for powering the windings. The plastic housing has an annular end that captures an annular surface of the connector structure coupling the plastic housing to the connector structure.

In accordance with another aspect of the invention, an idle air control valve for a vehicle includes a plastic housing having an integral flange for mounting the actuator. A stator assembly is disposed in the plastic housing with the stator assembly having windings. A rotor assembly, having a permanent magnet, is mounted for rotation with respect to the stator assembly such that when the windings are energized, a magnetic field is generated to cause rotation of the rotor assembly. A shaft is restricted from rotation and is associated with the rotor assembly such that rotation of the rotor assembly causes linear movement of the shaft. A pintle is associated with a distal end of the shaft for linear movement therewith. Connector structure houses leads for powering the windings. The plastic housing has an annular end that captures an annular surface of the connector structure, coupling the plastic housing to the connector structure.

In accordance with yet another aspect of the invention, a method provides a plastic housing for an actuator. The actuator has a stator assembly coupled to a connector structure, and a rotor assembly constructed and arranged to rotate with respect to the stator assembly. The method includes inserting the stator assembly with connector structure connected thereto into an interior of the plastic housing until a surface of the stator assembly engages a surface of the plastic housing, with an annular end of the plastic housing extending beyond an adjacent annular surface of the connector structure. The annular end of the housing is then deformed to capture the annular surface of the connector structure, thereby coupling the plastic housing to the connector structure.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawing, wherein like reference numerals refer to like parts, in which.

DETAILED DESCRIPTION OF THE EXEMPLARY EMBODIMENTS

For illustrative purposes, throughout the following discussion the invention is described as it is incorporated into a particular magnetic device used in a specific product assembly, namely an electric motor, generally indicated at 10, in the form of a stepper motor that provides linear actuation for an idle air control valve assembly 11 for a vehicle. However, the invention is equally applicable to other linear actuator devices that are employed in harsh environment.

Figure 1:
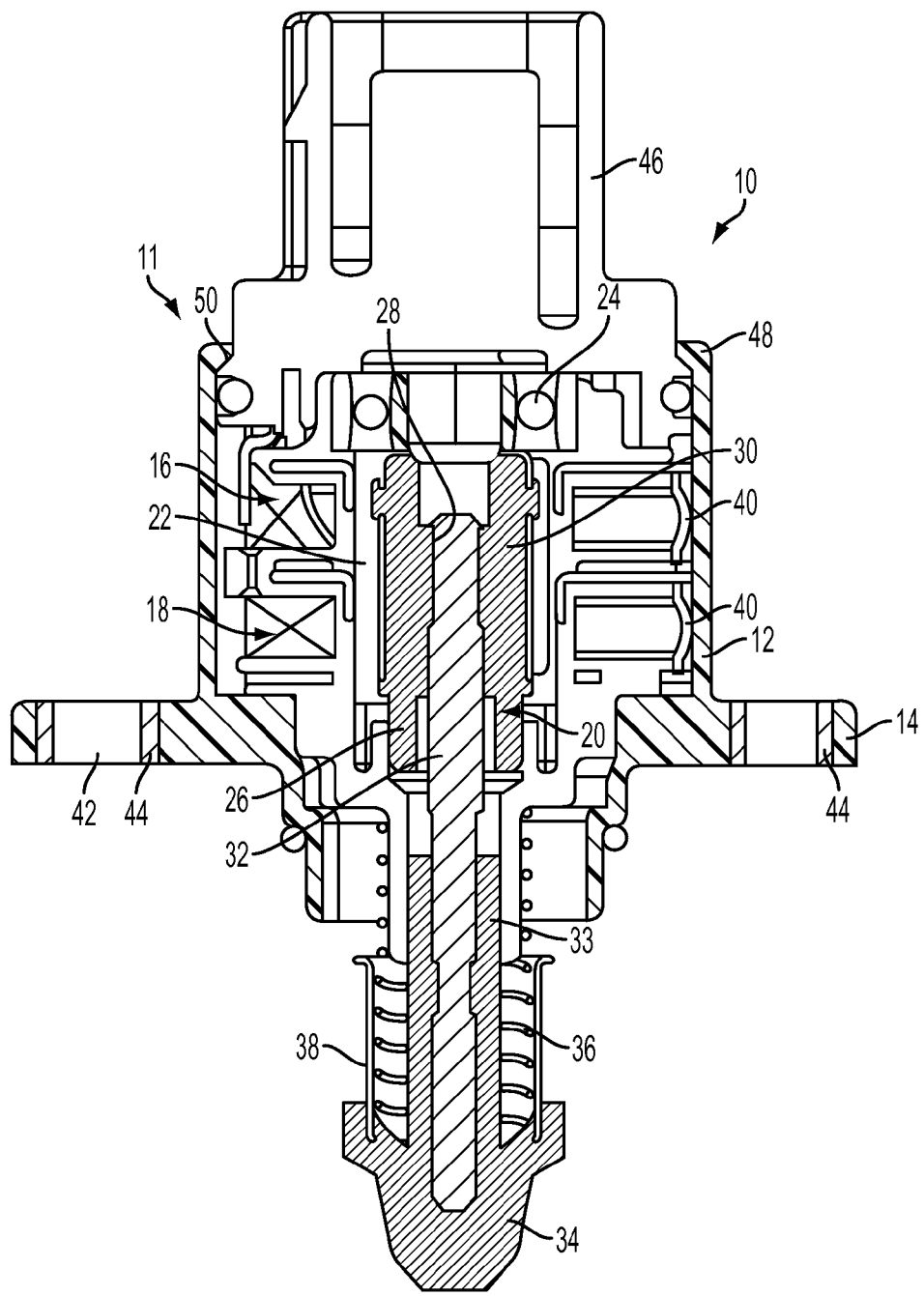
FIG. 1 is an axial sectional view of an embodiment of a digital linear actuator in the form of an idle air control valve (IACV) in accordance with an embodiment of the invention.

With reference to FIG. 1, a motor, generally indicated at 10, of an Idle Air Control Valve (IACV) for use in a vehicle is shown in accordance with an embodiment of the present invention. The motor 10 includes a plastic housing 12 with integral flange 14 extending outwardly of the housing 12. A stator assembly, generally indicated at 16, is disposed in the housing 12. The stator assembly 16 includes the conventional windings 18, field cups, pole plates, and bobbins.

As shown in FIG. 1, a rotor assembly, generally indicated at 20, is associated with the stator assembly 16. The rotor assembly 20 has the conventional permanent magnet 22 generally adjacent to the windings 18. Bearing structure, including a rear, sealed ball bearing 24 and a front eyelet bearing 26 supports the rotor assembly 20 to permit rotation of the rotor assembly 20 relative to the stator assembly 16. In the embodiment of motor 10 as a stepper motor, introduction of a current in the coil windings 18 of the stator assembly 16 causes rotational movement of the rotor assembly 20. The rotor assembly 20 has a passage 28 there-through including a threaded portion 30 for engagement with a threaded portion of shaft 32. The distal end of the shaft 32 is associated with a front bearing 33, preventing shaft rotation. Therefore, rotational motion of rotor assembly 20 is converted into linear motion of shaft 32, making this stepper motor a linear actuator.

In the embodiment of the motor 10 used in an idle air control valve, the shaft 32 has an integral pintle 34 at its distal end. A spring 36 tends to bias the pintle 34 in an extended position. The pintle 34 receives a cylindrical grime shield 38 to protect against contamination of the motor 10. With the example of the idle air control valve shown in FIG. 1, the motor 10 can be fitted within a bore of an intake manifold or throttle body. To control airflow into the manifold.

Since the housing is made of plastic instead of metal, to ensure that the flux path is not disrupted, additional, compensating flux ring structure 40 is provided at the perimeter of the stator assembly 16. In the embodiments the flux ring structure 40 includes a pair of ferrous material flux rings disposed about the stator assembly 16, generally adjacent to the windings 18.

The flange 14 provides bolt holes 42 there-through for the mounting hardware to the manifold. Since the material of the flange 14 is plastic (instead of metal), M4 and M5 mounting bolts could damage the plastic flange 14 when torqued to the prescribed installation torque. Thus, metal, preferably split-ring compression limiters 44 are provided in the bolt holes 42 to prevent damage to the flange 14. The limiters 44 frictionally engage the surfaces defining the bolt holes 42.

An important retention feature of the motor 10 is heat rolling of the plastic housing 12 to capture a connector structure 46 of the motor 10 and thus capture the stator assembly 16 and rotor assembly 20 that are coupled to the connector structure 46. The connector structure houses leads 47 (FIG. 4) for powering the windings 18 in the conventional manner. Alternative methods of coupling the plastic housing 12 to the connector structure 46 were attempted. For example, molding snap fingers on the inner surface of the housing 12 was not possible.

Further, ultrasonic welding of the core of the motor 10 to a plastic housing 12 had mixed results. After thermal cycling, the ultrasonic weld retention load was compromised. Secondary, contamination of the ultrasonic weld surfaces were found unpredictable. Thus, the heat rolling process, explained below, was developed.

Figure 2:
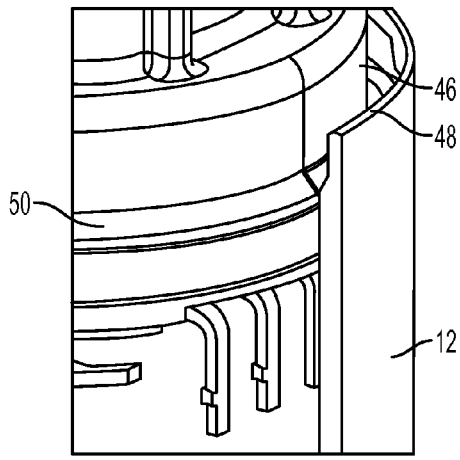
FIG. 2 is view of a portion of an end of a plastic housing of the IACV prior to heat forming thereof.
Figure 3:
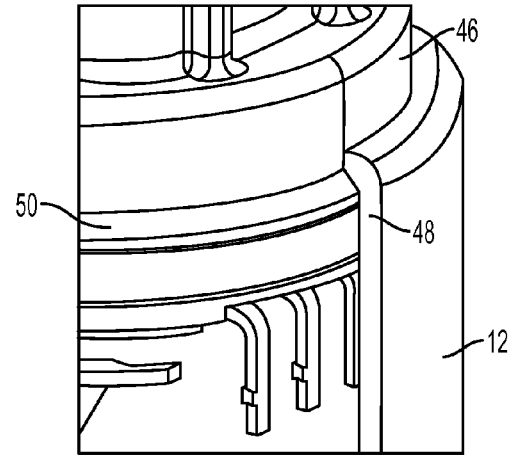
FIG. 3 is a view of a portion of the end of the plastic housing of FIG. 2, shown after heat rolling to capture a portion of a connector structure.
Figure 4:
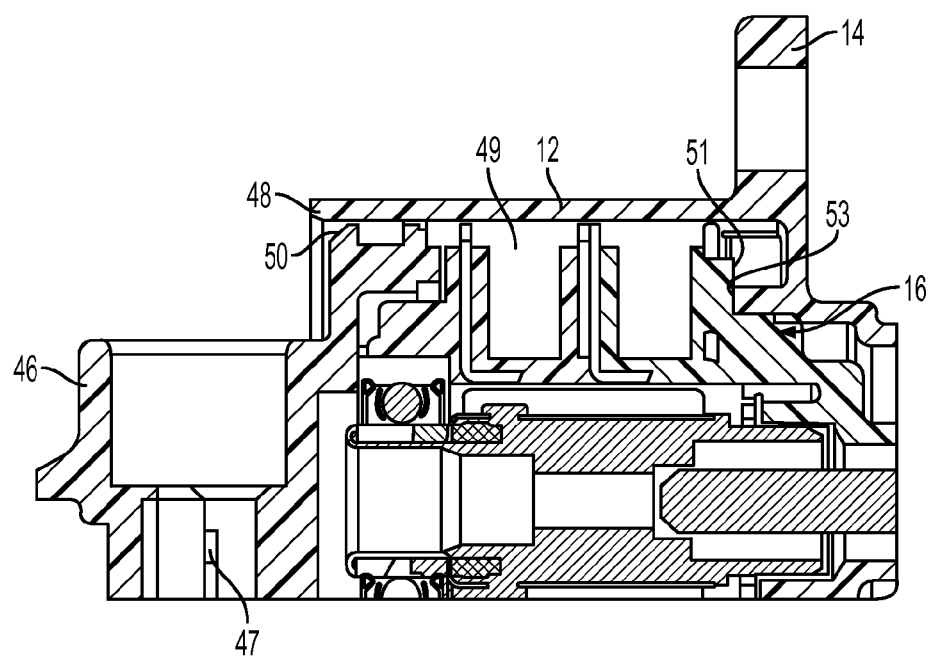
FIG. 4 is a partial sectional view of the end of the plastic housing prior to heat rolling thereof.
Figure 5:
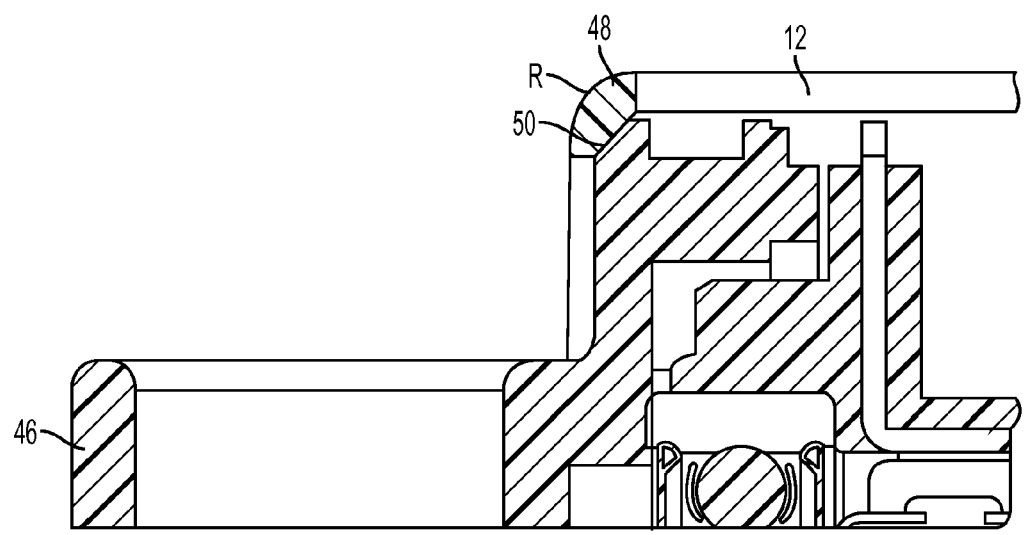
FIG. 5 is a partial sectional view of the end of the plastic housing after heat rolling and shown capturing a portion of the connection structure.

In accordance with the embodiment and with reference to FIGS. 2-4, the connector structure 46 is inserted axially into the interior 49 of the plastic housing 12 until a planar surface 51 of the stator assembly 16 contacts a planar surface 53 (FIG. 4) of the plastic housing 12. As seen in FIGS. 2 and 4, after such insertion, a distal, annular end 48 of the housing 12 extends beyond an annular surface 50 of the connector structure 46. Thereafter, a heat rolling process heats and deforms the end 48 to capture the annular surface 50 (FIGS. 1, 3 and 5) of the connector structure 46 thereby coupling the plastic housing 12 to the connector structure 46. This heat deformation process of the plastic housing 12 functionally replicates a swaged metal housing. Thus, in the embodiment, the end 48 is deformed to have a radius R of approximately 1.9 mm.

The heat roll formation of the plastic is more difficult than the conventional metal swage. Functional requirements for the heat roll connection are, a static 90 N axial load test and also to retain structural integrity after thermal life cycling and thermal vibration. The plastic housing 12 provides sufficient flexure that ensures alignment throughout the range of thermal exposure (e.g., −40 to +125 C. manifold ambient environment). This flexure, in addition to axial support, provides additional tolerance to manifold vibration since excess vibration can damage the internal motor of the IACV. The heat roll connection between the housing 12 and the connector structure 46 can be air leak tested as witnessed by IACV on the engine manifold.

Figure 6:
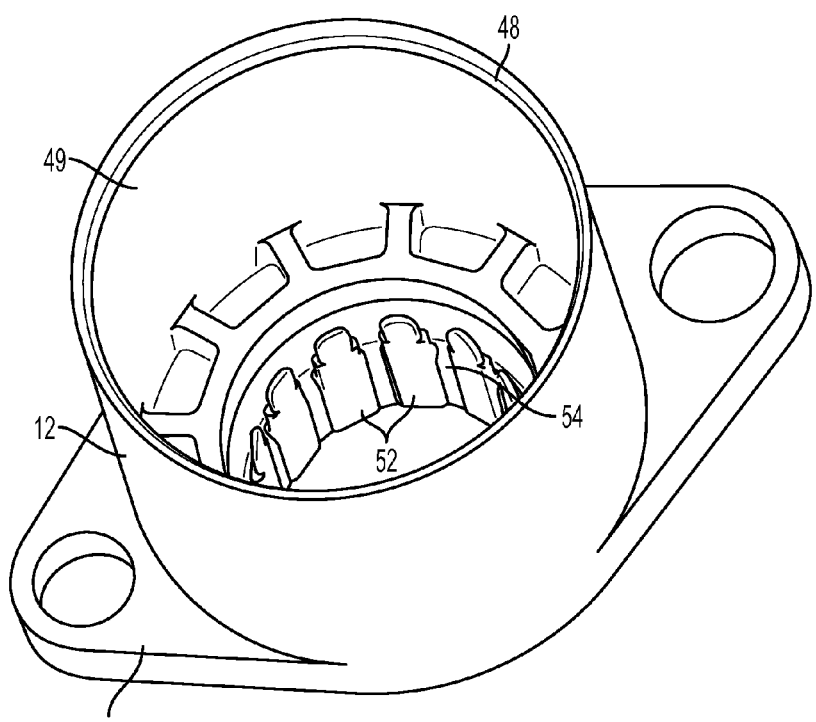
FIG. 6 is a view of the plastic housing of the IACV showing tabs of anti-rotate structure.
Figure 7:
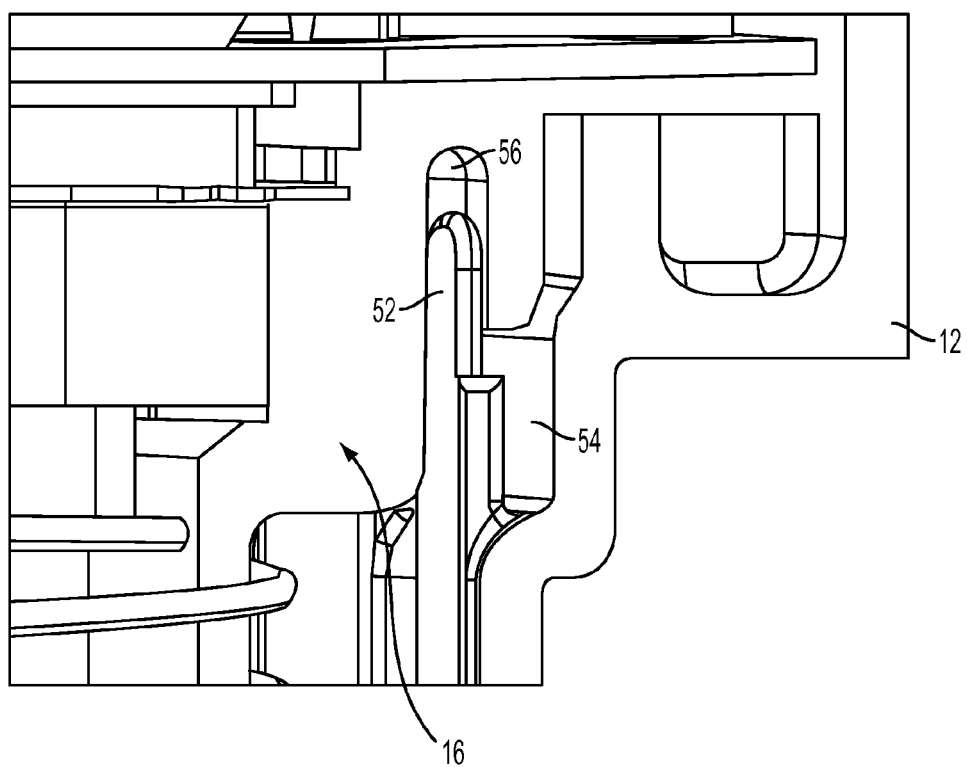
FIG. 7 is a view showing the anti-rotate structure with a tab engaged in a pocket of the stator assembly of the IACV.

Another important retention feature of the motor 10 is anti-rotate structure created between the plastic housing 12 and the stator assembly 16. As seen in FIG. 6, a plurality of tabs 52, preferably molded into the hosing 12, extend in spaced relation about an interior surface 54 of the plastic housing 12. As shown in FIG. 7, the stator assembly 16 includes a plurality of pockets 56, with one pocket 56 being associated with one tab 52. Thus, upon assembly of the housing 12 with the stator assembly 16, each tab 52 engages an associated pocket 56. The configuration is such that the interference between the pocket 56 and tab 52 is sufficient that the plastic of the tabs 52 and plastic of the surfaces defining the pocket 56 yield or deform creating a tongue and groove anti-rotate interlock structure. The functional requirement for this anti-rotate structure is a 5.5 N-m resistance of the core of the motor turning without violating the angle location requirement of the electrical connector of the connector structure 46.

The plastic used for the housing can by any plastic material suitable for the environment of an idle air control valve. Features of the plastic housing 12 include:

unique external heat forming the plastic housing end 48 after assembly to retain the core motor external heat form allows for 360° connector orientation with respect to the housing 12 whereas conventional internal snap retention configurations are location sensitive heat form method less expensive solution to ultrasonic welding with existing jointing issues molded internal anti-rotation interlock structure flange/housing integration eliminates existing jointing issues flange compression limiters allow use of existing hardware (manifold)

weight savings the plastic housing exterior eliminates corrosion plating and associated cosmetics rejects motor efficiency is higher due to provision of the flux ring structure utilizes existing production core motor with minimal refinements The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A linear actuator comprising:

a plastic housing having an integral flange for mounting the actuator, a stator assembly disposed in the plastic housing, the stator assembly having windings, a rotor assembly, having a permanent magnet, mounted for rotation with respect to the stator assembly such that when the windings are energized, a magnetic field is generated to cause rotation of the rotor assembly, a shaft restricted from rotation and associated with the rotor assembly such that rotation of the rotor assembly causes linear movement of the shaft, and connector structure housing leads for powering the windings, wherein the plastic housing has an annular end that engages and captures an annular surface of the connector structure, coupling the plastic housing to the connector structure, wherein the annular end of the plastic housing is deformed to as to engage and capture the annular surface of the connector structure.

2. The actuator of claim 1, wherein the flange includes bolt holes there-through, a metal compression limiter being frictionally engaged with surfaces defining each bolt hole.

3. The actuator of claim 1, further comprising flux ring structure of ferrous material disposed about the stator assembly, generally adjacent to the windings.

4. The actuator of claim 1, wherein the plastic housing and the stator assembly include anti-rotate structure constructed and arranged to interlock to prevent rotation of the stator assembly with respect to the plastic housing.

5. The actuator of claim 4, wherein the anti-rotate structure comprises a plurality of tabs provided in the plastic housing, with each tab engaging an associated pocket defined in the stator assembly.

6. An idle air control valve for a vehicle comprising:

a plastic housing having an integral flange for mounting the actuator, a stator assembly disposed in the plastic housing, the stator assembly having windings, a rotor assembly, having a permanent magnet, mounted for rotation with respect to the stator assembly such that when the windings are energized, a magnetic field is generated to cause rotation of the rotor assembly, a shaft restricted from rotation and associated with the rotor assembly such that rotation of the rotor assembly causes linear movement of the shaft, a pintle associated with a distal end of the shaft for linear movement therewith, and connector structure housing leads for powering the windings, wherein the plastic housing has an annular end that engages and captures an annular surface of the connector structure, coupling the plastic housing to the connector structure, wherein the annular end of the plastic housing is deformed to as to engage and capture the annular surface of the connector structure.

7. The control valve of claim 6, wherein the flange includes bolt holes there-through, a metal compression limiter being frictionally engaged with surfaces defining each bolt hole.

8. The control valve of claim 6, further comprising flux ring structure of ferrous material disposed about the stator assembly, generally adjacent to the windings.

9. The control valve of claim 6, wherein the plastic housing and the stator assembly include anti-rotate structure constructed and arranged to interlock to prevent rotation of the stator assembly with respect to the plastic housing.

10. The control valve of claim 9, wherein the anti-rotate structure comprises a plurality of tabs provided in the plastic housing, with each tab engaging an associated pocket defined in the stator assembly.

* * * * *